April 8, 1930.  W. ESPE  1,754,152
SERIES RESISTANCE FOR ELECTRIC MEASURING INSTRUMENTS
Filed Oct. 19, 1925
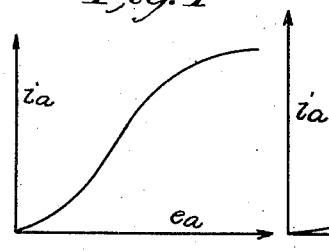
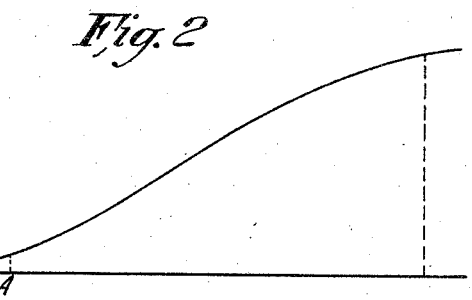
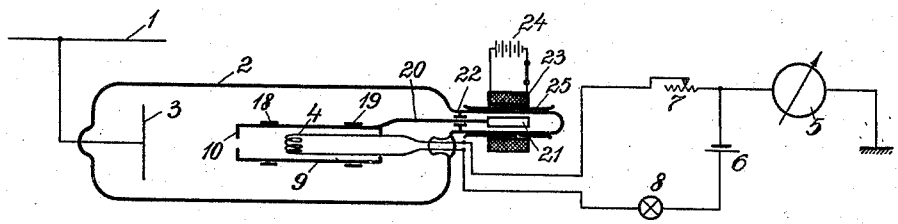
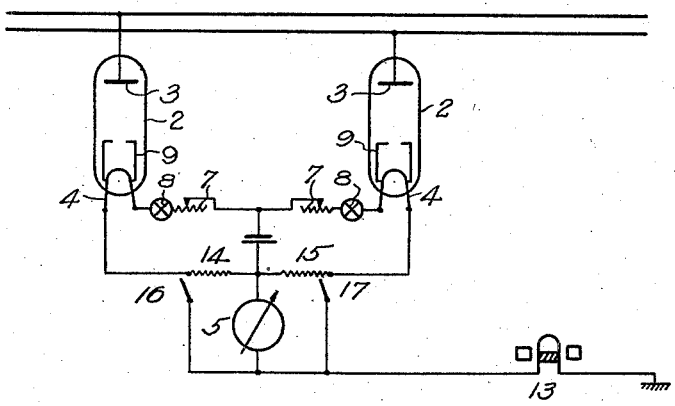
Inventor
Werner Espe Patented Apr. 8, 1930

1,754,152

UNITED STATES PATENT OFFICE

WERNER ESPE, OF BERLIN-CHARLOTTENBURG, GERMANY, ASSIGNOR TO SIEMENS SCHUCKERTWERKE GESELLSCHAFT MIT BESCHRANKTER HAFTUNG, OF SIEMENS-STADT, NEAR BERLIN, GERMANY, A CORPORATION OF GERMANY

SERIES RESISTANCE FOR ELECTRIC MEASURING INSTRUMENTS

Application filed October 19, 1925, Serial No. 63,431, and in Germany September 10, 1924.

My invention refers to series-resistances for measuring instruments which measure electric values (such as voltage or curve forms) and which are particularly suitable in connection with the measurement of very high voltages in so far as by the use of such resistances the disadvantages inherent to series-reactances heretofore used for this purpose are avoided.

The measurement of high voltages was hitherto effected as a rule on the low tension side of the transformer or with the aid of a special instrument transformer. Not taking into consideration that it is generally desirable to measure high voltages directly, this method proves a failure in the case of high tension direct current which recently has become of great industrial importance. High ohmic resistances may in such a case be connected in series with the measuring instrument. This can, however, only be done up to a total voltage of about 3000 volts. In the case of higher voltages the construction of these resistors encounters great obstacles. The insulation becomes very difficult and the series resistances assume excessive dimensions.

A further disadvantage of the hitherto customary series resistors resides in the fact that it is impossible to construct them entirely free from inductance or capacitance. This property is particularly disadvantageous when high frequency voltages are to be measured because the total equivalent series resistance then possesses a different value for each frequency.

My invention relates to a resistor to be connected into an electric circuit and adapted to withstand high voltages and which does not have the defects of the resistors hitherto employed.

According to my invention a high vacuum discharge valve is employed as resistor to be connected in the circuit. Such valves which are usually provided with a hot cathode, and constitute thus thermionic valves, can be so designed that even at high voltages they permit the passage of only a small current. For this reason they are very suitable as series resistors. A system has already been disclosed in which a flow discharge valve serves as series resistor in a low tension circuit. Compared with this system the employment of a high vacuum valve has the advantage that it is suitable for voltages of any magnitude.

According to my invention the connection of such a valve as resistor into the circuit is made in such a manner that for the respective valve within the voltage range in question the current of any one of the valve circuits is a direct linear valued function of the voltage impressed upon the said or any other circuit. The magnitude of this current therefore gives the magnitude of the voltage to be measured. Thus this anode current of a hot cathode valve, up to its saturation value, constitutes within a certain range of voltage a single-valued approximately linear function of the voltage impressed upon the valve. The grid current behaves similarly if a thermionic valve with control grid is employed.

To render the thermionic valve suitable for measuring high voltages, it is necessary to adapt it specially for the purpose. By suitable means, such as is provided by contracting the path of discharge of the electrons in the vacuum, arranging suitable screens, or providing one or a plurality of grids with auxiliary voltages, the voltage at which the saturation current develops in the valve (saturation voltage) is raised to a higher value than in the hitherto customary thermionic valves. In the prior art valves the saturation voltage is attained at about 1000 volts. If therefore pressures above 1000 volts are to be measured this could not be done with the hitherto customary valves because then there exists no longer a direct linear relation between current and voltage.

In the drawings affixed hereto

Fig. 1, shows the relation between the anode current $i_a$ and the anode voltage $e_a$ in the hitherto customary thermionic valves.

The characteristic is a comparatively steep curve and the saturation current is reached at a low voltage.

Fig. 2 shows the characteristic for a thermionic valve designed according to my invention in which, for instance, by screening the incandescent cathode the saturation current is attained at a considerably higher voltage.

Fig. 3 shows diagrammatically a constructional arrangement of a valve according to my invention, including the associated circuits, and Fig. 4 shows an arrangement for oscillographing and simultaneously measuring alternating currents.

The application of thermionic valves for measuring or tracing the curves of electric pressures has the advantage that the valve, if properly designed, can be employed for measuring very high voltages without encountering insulation difficulties such as arise with ordinary series resistances heretofore used. The series resistance remains, furthermore, absolutely constant and is entirely independent of all temperature influences. Compared with the hitherto employed resistors the valve is, furthermore, of comparatively small dimensions. A further advantage of the thermionic valve as a resistor is that it is entirely free from inductance and almost free from capacitance. The connection of the thermionic valve in the circuit is therefore particularly important for measuring high frequency voltages. This equally applies to the employment of the valve for the purpose of measuring high-tension direct current. As already pointed out it is the measuring of high-tension current which offers the greatest difficulties.

In Figure 3 of the drawing the new arrangement according to my invention is illustrated by way of example.

Referring to this figure, 1 is a high tension direct current line the voltage of which relatively to earth is to be measured. For this purpose the anode 3 of the thermionic tube 2 is connected with the high voltage source. The hot cathode 4 is grounded across the ammeter 5. The heating of the cathode is effected by means of the battery 6. In the heating circuit is also connected a resistor 7 for the correct adjustment of the heating current. To prevent undesirable fluctuations in the heating current an iron wire resistance lamp 8 is connected in the heating circuit which has the tendency to keep the current constant, as is well known.

As already mentioned it is advisable to keep the characteristic of the valve as flat as possible to permit the measurement of as high a voltage as possible single-valued and to extend the measuring range of the system as far as possible. To attain this end in view, the hot cathode 4 in the interior of the valve is partly screened by means of a cold element part. The distance between cathode and anode is furthermore made comparatively great. For the purpose of screening it the hot cathode is in the arrangement in Fig. 3 disposed in the interior of a cylinder 9. The end of this cylinder facing the anode is furthermore provided with a restricted opening or apertured diaphragm 10 which effects a further screening of the cathode. The whole arrangement has the effect that the electrons pass out of the cylinder from the hot cathode to the anode only at a high anode potential. The characteristic of the valve assumes therefore the flat shape shown in Figure 2 and the anode current traversing the ammeter 5 represents up to a very high voltage impressed upon the valve (above all within the limits A and B of Fig. 2) a single-valued measure for the voltage.

The utilization of the thermionic valve as series resistor for measuring electric pressures has the further advantage that in spite of suddenly developing excess voltages the measuring instrument is not endangered by excess currents. It is only necessary to design the measuring instrument in such a manner that the maximum measuring current permissible for the instrument is equal to the saturation current of the thermionic valve. A suddenly developing excess voltage is therefore unable to damage the measuring instrument because it does not essentially increase the anode current beyond the bend of the curve (B in Fig. 2). In order to carry through this safe-guard of the measuring instrument for various measuring ranges, it is sometimes desirable to influence the characteristic of the thermionic valve. This may, for instance, in Fig. 3 be brought about by longitudinally displacing the cylinder 9 by a force applied from outside which has the same effect as more or less closing the opening 10 of the cylinder. This displacement of the cylinder may for instance be attained in practice by slidingly disposing cylinder 9 in guide rings 18 and 19 as is shown in Fig. 3. In order to move cylinder 9 into the proper position, the cylinder is provided with a rearwardly extending rod 20 which carries at its end an iron core 21 which is located in an extension 22 of the glass vessel 2. This iron core is under control of a magnetic field produced by a coil 23 which is disposed on the outside of extension 22. If this coil is excited with direct current, for instance from a source 24, it will draw the iron core 21 into and retain it in its interior so that now by sliding coil 23 into the proper position, iron core 21 is moved with it and thus also cylinder 9. In order to more conveniently shift coil 23 it is preferably mounted on a guide tube 25.

The thermionic valve, as already mentioned, may also be employed as series resistor for tracing oscillographic curves since it is free from inductance and capacitance.

In such cases the measuring circuit has included in it the loop of the oscillograph, if necessary in series relation with the ammeter. Fig. 4 of the drawing shows such a system for oscillographing and simultaneously measuring alternating current voltages. In order to be able to trace both halves of the voltage curve of the alternating current two thermionic valves are provided which are connected with their anode terminals to the two alternating current sources. As is quite well known from the elementaries of alternating current measurements, in such an arrangement the current flowing during the positive half of the curve, and affecting the oscillograph, flows by way of one tube, and that flowing during the negative half flows by way of the other tube, and also affects the oscillograph, so that both half waves are recorded. The cathodes are connected to earth by a common line. Into this line is connected the ammeter 5 and the oscillograph loop 13. In the filament circuits are also connected the two resistors 14 and 15. These two resistances in cooperation with their respective switches 16 and 17 serve the purpose of adjusting the heating current for the tube cathodes to the right value before the actual measurement is made and to simultaneously measure this heating current by means of the same instrument 5 with which afterward the actual measurement is made. For instance, if it is desired to properly adjust the heating current for the left hand tube in Fig. 4 and to measure this current, switch 16 is closed so that now instrument 5 is located in parallel to resistance 14. Thus, assuming proper calibration of resistance 14 and the measuring instrument, the value of the heating current for the cathode of the left hand tube can be read off. If it is desired to adjust and ascertain the value of the right hand tube heating current, switch 16 is opened and 17 is closed. If on the other hand, the measuring instrument 5 is to serve only for indicating the current which flows through each electron tube during the measuring of the high voltage which exists between the lines 30 or 31 and ground in Fig. 4, both switches 16 and 17 are open. Of course, it is assumed that instrument 5 contains two scales, one calibrated according to high voltages and the other calibrated according to small amperage within the range of the tube heating currents.

For carrying out a high tension measurement with a system according to my invention the following method has proved suitable: the heating or filament current of the valve is switched in first. The milliammeter 5 thereby serves as stated before, temporarily for exact adjustment of the electrode heating current whereby it is alternately thrown in parallel to resistance 14 or 15. If necessary the heating current is adjusted for the correct value by adjusting the rheostats 7 (Fig. 4). The iron wire resistor lamp 8 suffices in each case for keeping the heating current constant. Then the high potential conductor 30 or 31 or both are connected with the anodes of the thermionic valves while the milliammeter 5 or the oscillograph loop 13 respectively is short circuited and finally the short circuit of the instrument or the oscillograph loop respectively is removed. Then the anode current is read off on the measuring instrument 5 which, as already mentioned, after switching out the shunt is connected in the measuring circuit. The anode current read on instrument 5 is a measure of the magnitude of the voltage to be measured. The milliammeter is preferably calibrated directly in kilovolts. After the reading of the voltage to be measured is finished, the instrument 5 is again short circuited and the heating current switched off.

I claim as my invention:

1. In a circuit for measuring electric values an electrodynamic measuring instrument having a series resistance comprising a thermionic high vacuum tube having an anode and a cathode connected in series with said instrument and means for raising the saturation voltage of said tube.

2. In a circuit for mesuring electric values an electrodynamic measuring instrument having a series resistance comprising a thermionic high vacuum tube having an anode and a cathode connected in series with said instrument and a cylinder within said tube surrounding the cathode for screening it against the anode to raise the saturation voltage of said tube.

3. In a circuit for measuring electric values an electrodynamic measuring instrument having a series resistance comprising a thermionic high vacuum tube having an anode and a cathode and a cylinder within said tube surrounding the cathode and being provided with an aperture diaphragm for screening the cathode against the anode to raise the saturation voltage of said tube.

4. In a circuit for measuring electric values a measuring instrument having a series resistance comprising a thermionic high vacuum tube having an anode and a cathode connected in series with said instrument and a cylinder within said tube surrounding the cathode for screening it against the anode to raise the saturation voltage of said tube and means for shifting said cylinder from without the tube for varying the screening action of said cylinder.

5. In a circuit for measuring electric values a measuring instrument having a series resistance comprising a thermionic high vacuum tube having an anode and a cathode connected in series with said instrument and a cylinder within said tube surrounding the cathode for screening it against the anode to raise the saturation voltage of said tube and means for shifting said cylinder, comprising an iron core attached to said cylinder, a solenoid coil movably disposed outside of said tube and surrounding the tube portion within which said core is located, and means for energizing said coil to enable it to hold said core in its interior when the coil is shifted.

In testimony whereof I affix my signature.

WERNER ESPE.